Aug. 6, 1957 W. A. THOMAS 2,801,751
HIGH PRESSURE VALVED FILTERS
Filed March 2, 1955 6 Sheets-Sheet 1
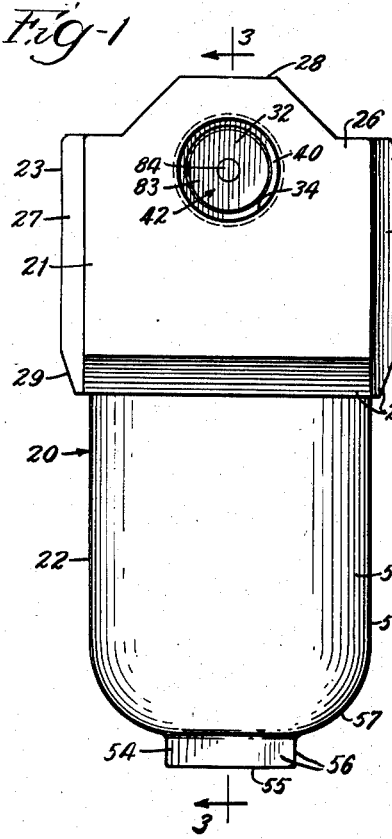
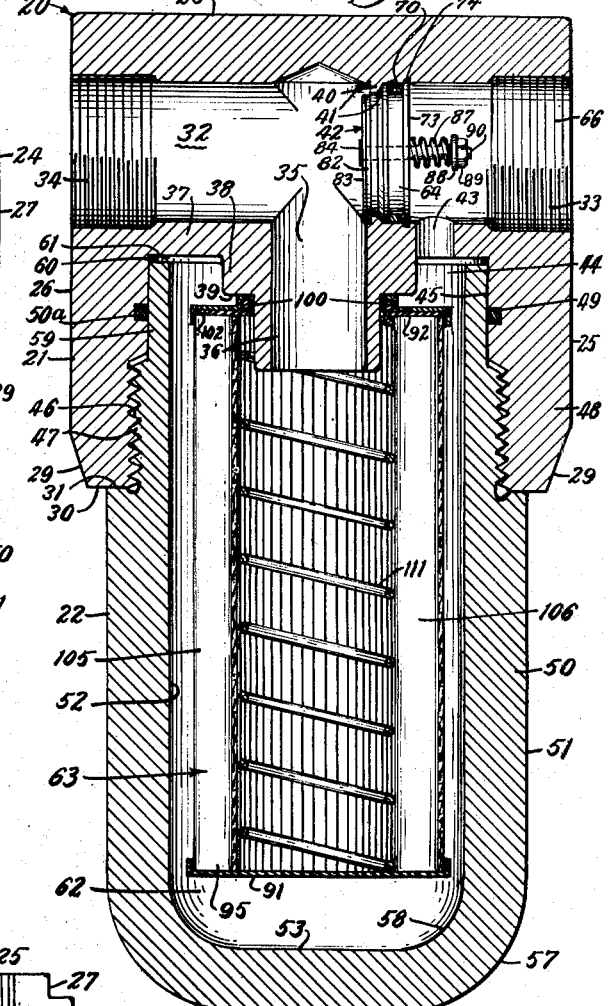
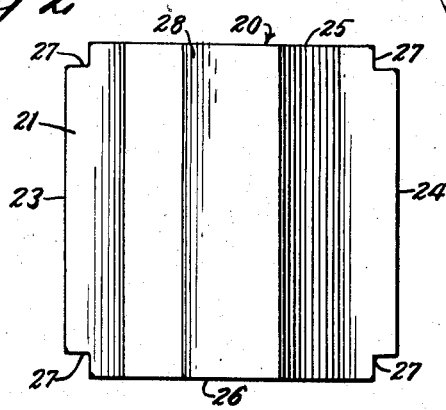
INVENTOR.
William A. Thomas
BY
Robert H. Wendt
Atty.

Aug. 6, 1957 W. A. THOMAS 2,801,751
HIGH PRESSURE VALVED FILTERS
Filed March 2, 1955 6 Sheets-Sheet 2
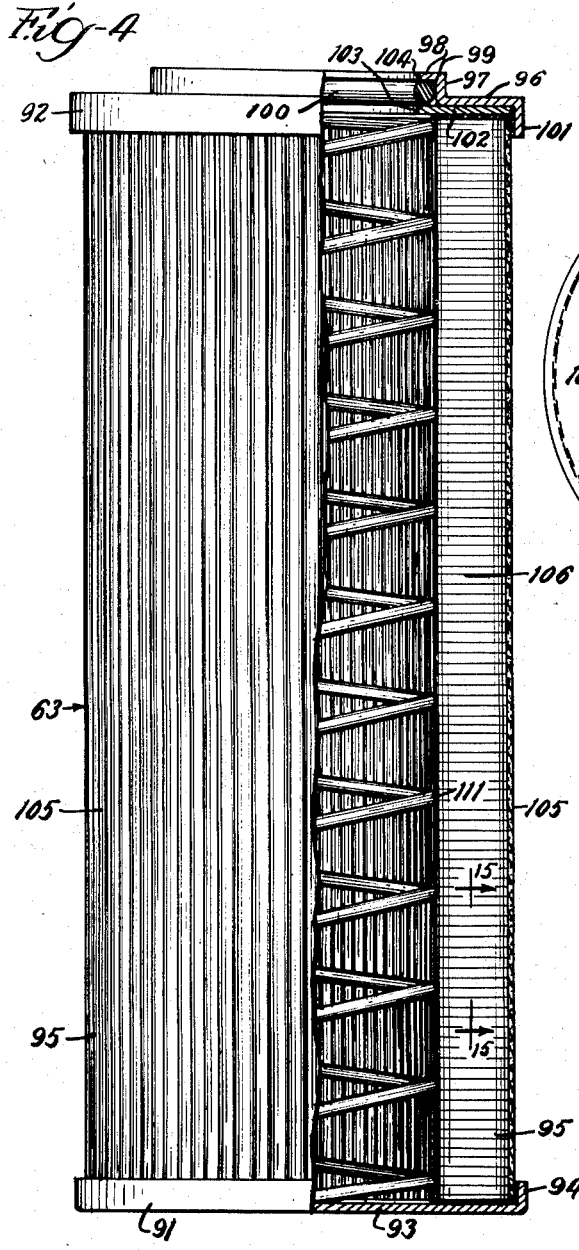
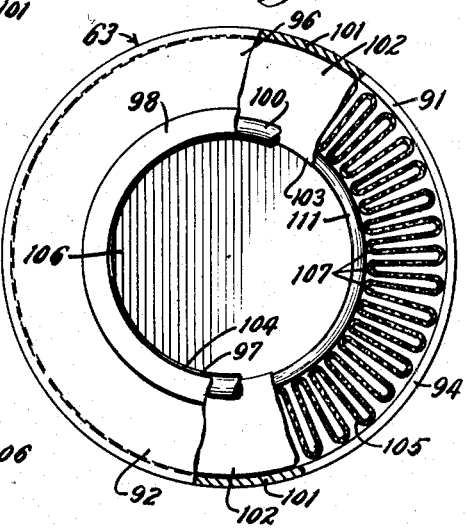
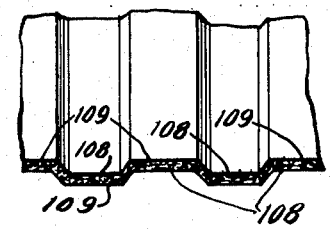
INVENTOR.
William A. Thomas
BY
Robert H. Wendt
Atty.

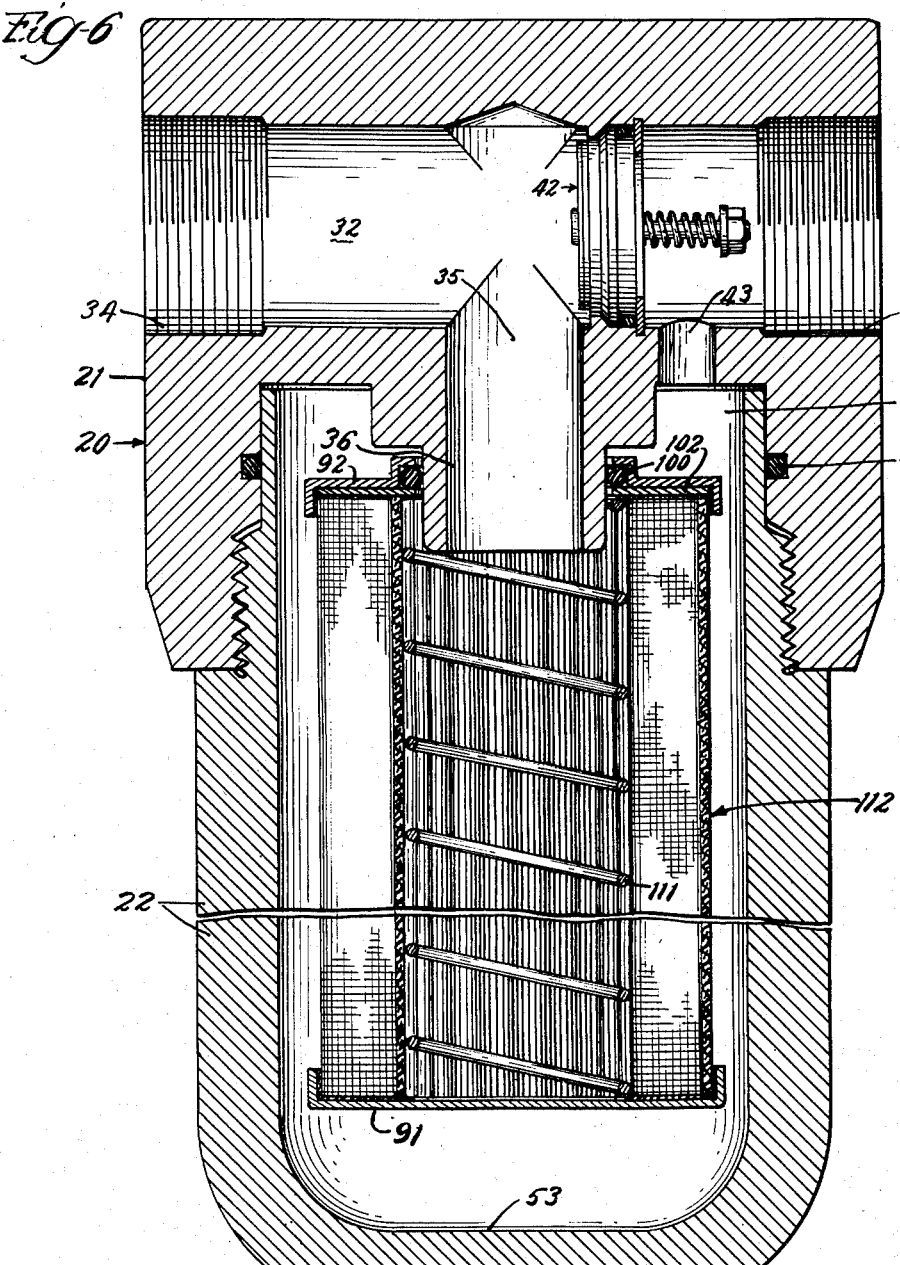

Aug. 6, 1957 W. A. THOMAS 2,801,751
HIGH PRESSURE VALVED FILTERS
Filed March 2, 1955 6 Sheets-Sheet 4
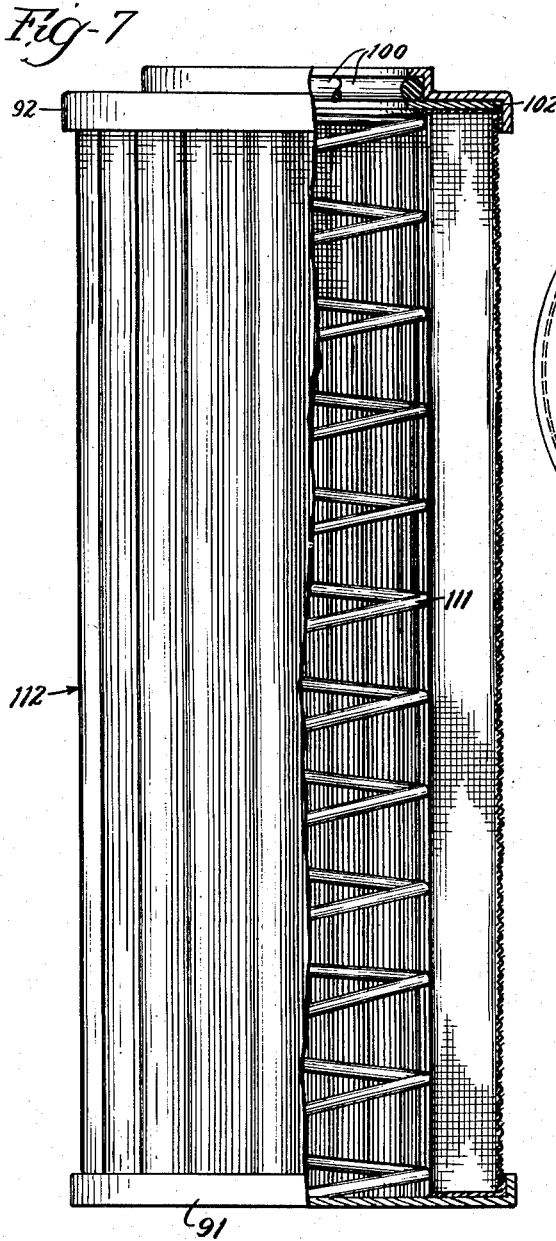
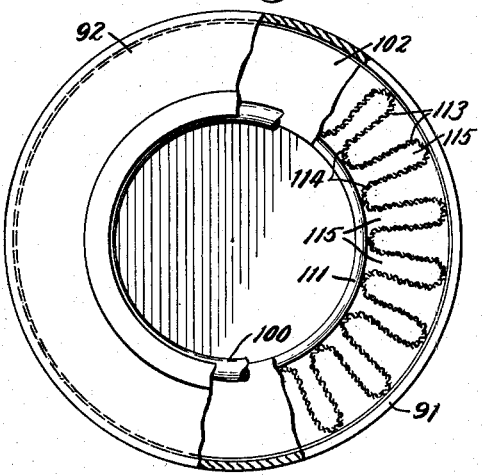
INVENTOR.
William A. Thomas
BY
Robert H. Wendt
Atty.

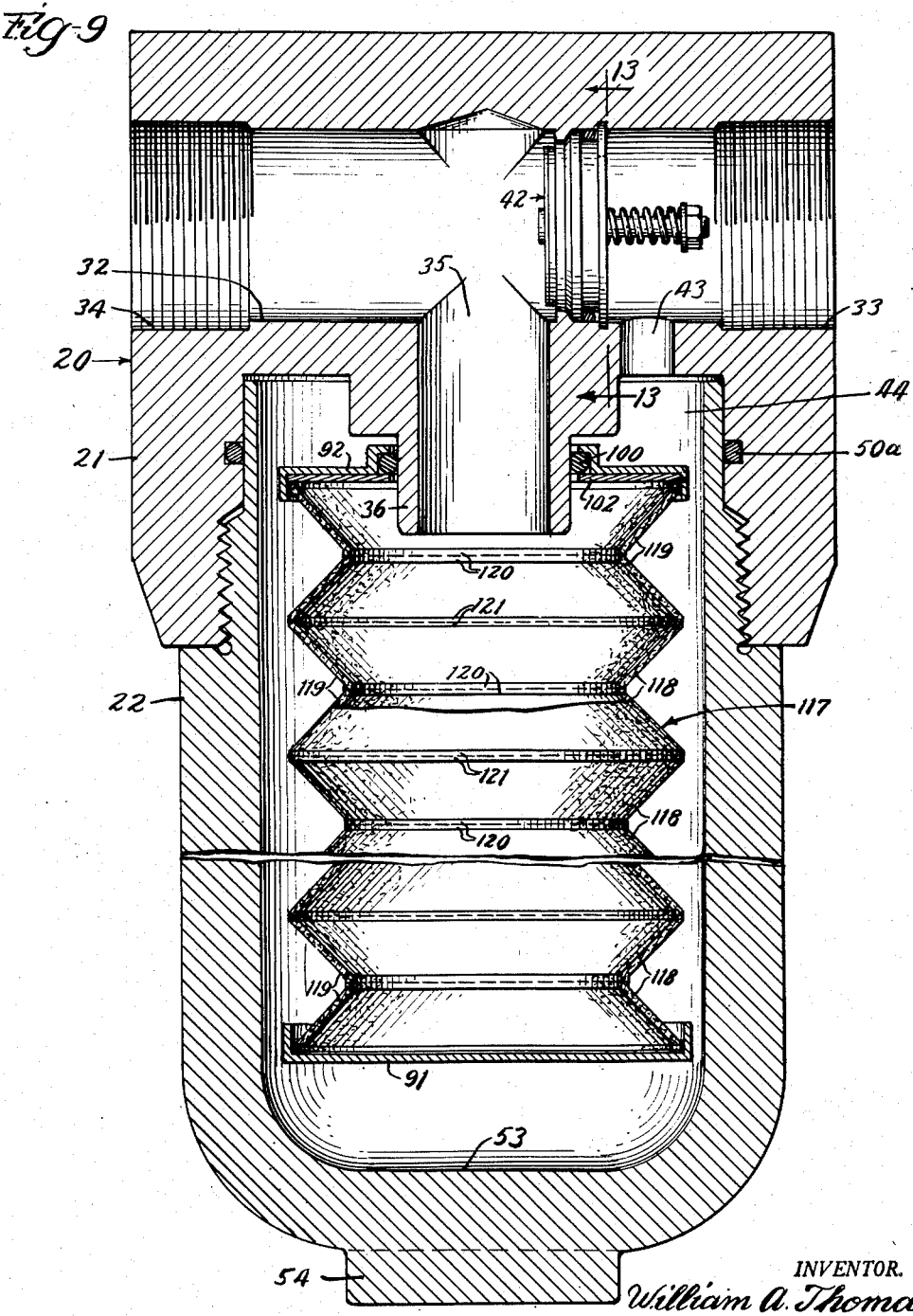

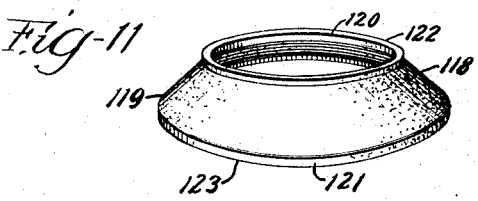
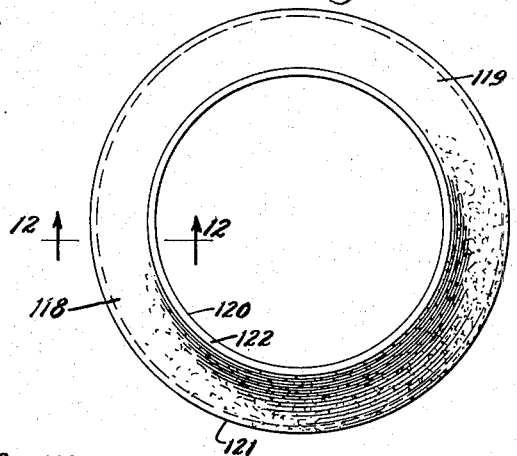
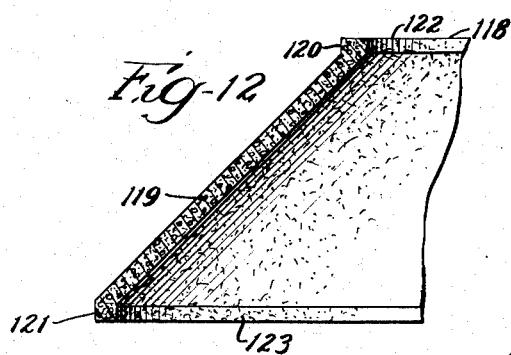
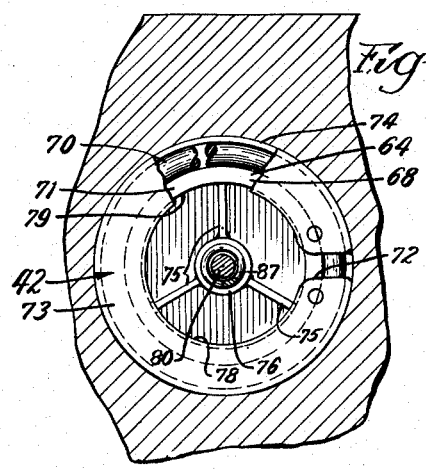
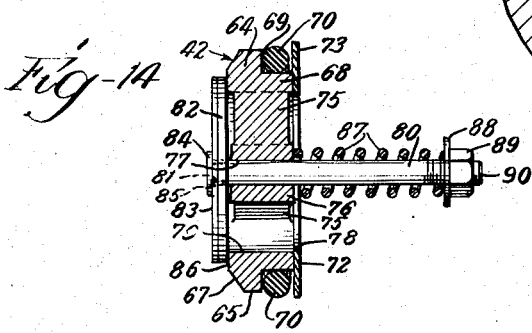

United States Patent Office 2,801,751
Patented Aug. 6, 1957

2,801,751

HIGH PRESSURE VALVED FILTERS

William A. Thomas, Chicago, Ill., assignor to Marvel Engineering Company, Chicago, Ill., a corporation of Illinois Application March 2, 1955, Serial No. 491,660

1 Claim. (Cl. 210—133)

The present invention relates to high pressure valved filters, and is particularly concerned with filters of the type adapted to filter the oil, fuel, and gas for engines and for hydraulic systems which require a liquid which is clear of residue of any kind that might interfere with the operation of the engine or its associated parts.

One of the objects of the invention is the provision of an improved high pressure filter which is simple in construction, which includes a minimum number of parts, and which may be manufactured at a low cost because it involves a minimum number of machine operations and utilizes parts which may be manufactured economically.

Another object of the invention is the provision of an improved high pressure filter which may be constructed with a high factor of safety in so far as pressure in concerned, and which is adequately protected against leakage or excess pressures by simple constructions which do not substantially increase the cost of the assembly.

Another object of the invention is the provision of an improved filter of the type having a spring pressed by-pass valve for by-passing surges of pressure and for by-passing the flow when the filter becomes clogged to such a point that the differential of pressure between inlet or outlet is sufficient to open the by-pass valve; and which includes a plurality of component parts which are quickly attachable and detachable as replaceable units, so that the filters may be repaired or placed in operative position whenever required by merely inserting another filter unit or another by-pass unit.

Another object of the invention is the provision of an improved by-pass valve assembly for valved filters which is readily replaceable, which may be manufactured at a low cost by assembly of simple parts made by pressing operations, which is adjustable as to pressure, and which provides a wide opening without restriction between inlet and outlet because there are no other parts, such as spring retainers interposed in the stream of liquid when the valve is open.

Another object of the invention is the provision of improved filter units quickly attachable and detachable from the filter housing, with a leak proof connection, and including a simple structure comprising only a pair of caps cemented to the ends of a sinuous filter element, so that the amount of material and labor involved is reduced to a minimum.

Another object of the invention is the provision of improved filter units including metal caps which are cemented directly to the ends of a filter unit having porous side walls, such as paper, wire cloth, sintered porous metal having the following advantages:

1. The filter unit is light and strong due to its foregoing construction.
2. The breakage expected in card bonded caps is eliminated.
3. Leakage is positively prevented at both ends of the unit.
4. The unit so constructed it is adapted to absorb shock and any pressure placed upon it is placed upon the exterior.

Another object of the invention is the provision of improved filter units constructed of powdered porous sintered metal which are constructed in such design that there is a maximum amount of filtering surface and a minimum back pressure due to the porosity and increased amount of filter element surface.

Another object of the invention is the provision of improved sintered porous metal filter elements which after their being formed by pressure may be subjected to a coining operation for increasing the density and controlling the porosity, and which filter elements may be tested by sound waves to check the porosity and maintain a definite control over the quality, and filtering characteristics of the filter elements.

Another object of the invention is the provision of an improved valved filter housing including a removable by-pass valve assembly and a removable filter unit assembly, a main housing having an inlet and outlet and a removable cover, all of which are secured and assembled in a simple manner, whereby the internal parts are sealed by pressure of the liquid and leakage is substantially eliminated.

Other objects and advantages of the invention will be apparent from the following description and the accompanying drawings, in which similar characters of reference indicate similar parts throughout the several views.

Referring to the six sheets of drawings accompanying this specification,

Fig. 1 is a side elevational view on a small scale of a filter embodying the invention;

Fig. 2 is a top plan view;

Fig. 3 is a sectional view on a larger scale, taken on the plane of the line 3—3 of Fig. 1, looking in the direction of the arrows, showing one type of filter embodying the invention, with the filter element in partial section;

Fig. 4 is a side elevational view, in partial section, of the filter element of Fig. 2;

Fig. 5 is a top plan view of the filter unit of Fig. 4 in partial section;

Fig. 6 is a view similar to Fig. 3, utilizing a different form of filter unit constructed of closely woven wire screen cloth;

Fig. 7 is a side elevational view, in partial section, of the filter element of Fig. 6;

Fig. 8 is a top plan view of the filter unit of Fig. 7 in partial section;

Fig. 9 is a view similar to Fig. 3 of a filter having a porous filter element of sintered metal;

Fig. 10 is a plan view of the filter ring used in Fig. 9;

Fig. 11 is a view in perspective of one of the rings of which the filter element of Fig. 9 is made;

Fig. 12 is a fragmentary sectional view of one of the filter rings of Fig. 10 on the plane of the line 12—12 of Fig. 10;

Fig. 13 is a fragmentary sectional view on the plane of the line 13—13 of Fig. 9;

Fig. 14 is an enlarged sectional view taken through a removable by-pass valve assembly on the plane of its axis;

Fig. 15 is a sectional view on an enlarged scale showing the stamped grooves and ridges in the paper.

Referring to Figs. 1 to 3, 20 indicates in its entirety a high pressure valved filter embodying the invention.

The filter is preferably enclosed in an upper housing member 21, which is provided with a lower cover member 22, both of which are constructed of a suitable metal of high strength, such as an aluminum alloy, with thick walls adapted to provide a high factor of safety for operating pressures, such as 6,000 pounds per square inch, for example.

The upper housing member 21 comprises a block of metal which is substantially rectangular, having the four plane sides 23, 24, 25 and 26, provided with angular recesses 27 at the four corners, and provided with a plane upper surface 28.

The upper housing 21 may have its side walls 23—26 beveled at 29 to eliminate a sharp corner at its juncture with the bottom cover 22; and the end wall 30 of the top housing may have a plane surface to provide a seat for engaging a complementary seating shoulder 31 on the cover 22.

The upper housing is formed with a through bore 32, extending from the side 26 through to the side 25, which bore is threaded at its inlet 33 and threaded at its outlet 34 with suitable threads for attachment of high pressure pipes.

The through bore 32 communicates with a downwardly extending bore 35, located in a depending tubular formation 36, which is integrally formed with a partition wall 37, having a thicker walled tubular formation 38, supporting the tube 36.

The thick walled tubular formation 38 has an annular shoulder 39, which serves as a seat against which the filter unit is seated and held by pressure of the liquid in the housing and cover.

The housing 21 is formed as a forging with holes for the bores 32 and 35, formed on a smaller radius so that the bores may be drilled or reamed out with a minimum amount of labor; and the through bore 32 is formed with an annular, inwardly projecting flange 40, the right side of which in Fig. 2 forms a seat 41 for engaging the by-pass valve unit 42, separating the upper housing into the inlet and outlet portions thereof.

The partition 37 is provided with a through bore or conduit 43, leading from the inlet 33 into the annular space 44 surrounding the enlarged tubular formation 38.

The upper housing 21 is formed with an enlarged bore 45, having a smooth, cylindrical inner surface, and it is formed with a larger counterbore 46 at its outer end which internally threaded in a manner complementary to the threads 47 on the cover 22.

The enlarged bore 45 and threaded counterbore 46 are surrounded by the depending thick wall 48, forming an integral part of the block, of which the top housing 21 is formed.

The enlarged bore 45 is provided with an annular groove 49, located in its cylindrical wall between the ends of this enlarged bore and adapted to receive the resilient O-ring 50a, which comprises an endless ring of resilient rubber or "Duprene" which is circular in cross section and larger than the groove 49, so that the ring protrudes from the groove but may be forced back into the groove and caused to roll as the cover 22 is inserted, forming a liquid tight seal between cover and housing.

The cover 22 may comprise an elongated substantially cylindrical extruded metal member of the same metal, having a thick wall 50 for resisting the high pressures, the outer surface of which is cylindrical at 51 and the inside cylindrical at 52.

The end wall of cover 22 is plane at 53 on the inside and carries a rectangular, axially projecting lug 54 on the outside; and it has a plane end surface 55 and four plane sides 56.

This lug may be made of any suitable non-circular shape for grip with a wrench when installing or removing the cover. The end corners of the cover may be rounded at 57 on the outside and at 58 on the inside.

The thick side wall 50 of the cover is reduced in size and threaded at 47 over a substantial portion of its length for giving a long thread engagement with the threads 46 in the top housing; and an annular shoulder 31 on the cover engages the end 30 on the top housing.

Beyond the threaded portion 47 of the cover, the cover has a still further reduced, smooth cylindrical portion 59, which is slidably engaged in the bore 45 and slides into the O-ring 50a.

The end 60 of the top cover has a plane surface with a clearance with respect to the inner wall 61 of the top housing. Thus the cover 22 is adapted to enclose the open bottom of the top housing 22 and to provide a chamber 62 for a filter unit 63, with a suitable spacing between the filter unit and the inner walls 52, 53.

The chamber 62 communicates with the annular space 44 and with conduit 43 that leads to the inlet 33, but is shut off from the outlet by the by-pass valve 42.

Referring to Figs. 13 and 14, these are larger sectional views of the by-pass valve assembly 42, which is readily replaceable.

The by-pass valve assembly includes a circular body 64, having an outer cylindrical surface 65, slidably received in the bore 32. In order to provide for the insertion of the valve assembly the threaded end portion 66 of bore 32 at the inlet is made of larger diameter.

The valve body 64 has a frusto-conical beveled surface 67 at its left end (Fig. 14); and this beveled surface seats against the annular seat 41 on the flange 40.

At its opposite end the valve body 64 has a reduced portion 68, terminating at an annular shoulder 69 and forming an angular recess adapted to receive the circular O ring 70. The O ring is again made of rubber, "Duprene," or suitable resilient material, smaller in size than the reduced portion 68, so that it must be tensioned to be placed on said reduced portion; and the diameter of the cross section of the ring 70 is larger than the annular shoulder 69 so that the ring must be compressed to be inserted in the bore 32 and to provide a liquid-tight seal.

The right end 71 of the body 64 may be plane, and is adapted to be engaged by the overlying portion 72 of a resilient split snap ring 73, which fits in a complementary groove 74 in the bore 32 and retains the by-pass valve against the seat 41.

The valve body 64 has a plurality of radially extending flat vanes or spokes 75 integrally joined to a central guide sleeve 76, having a through bore 77. The split ring 73 has a central aperture 78 as large as the aperture 79 through the valve body between the spokes.

A valve plunger in the form of a threaded rod 80 is slidably mounted in the bore 77 and has a reduced portion 81, located in a central aperture in a resilient gasket disc 82.

The gasket disc 82 is engaged and supported by a metal disc 83, having a central aperture on the reduced portion 81, and the end of rod 80 is riveted over at 84 to form a head clamping the metal disc and gasket against the annular shoulder 85.

The disc and gasket 83, 82, are large enough so that the gasket engages the plane annular valve seat 86, closing the valve. The valve plunger 80 carries a compression coil spring 87, with its turns widely spaced and the end of the spring engaging sleeve 76.

The spring is under initial compression sufficient to hold the valve closed until a suitable liquid pressure is reached, and the end of the spring engages the washer 88, which is engaged by threaded nut 89 on the threaded end 90 of plunger 80. Thus the pressure of the spring may be adjusted, predetermining the liquid pressure at which the valve will open.

Referring to Figs. 4 and 5, these are views showing the specific construction of the removable and replaceable filter unit which is used in the filter 20.

This unit, indicated in its entirety by the numeral 63, includes a pair of stamped sheet metal caps 91 and 92. The lower closed cap merely has a flat, circular body 93 and an integral, inwardly turned cylindrical flange 94, fitting over the filter element 95 at one end and closing that end.

The cap 92 may comprise a sheet metal stamping having an annular body 96, which carries a centrally located cylindrical wall 97 and an annular end wall 98, forming a smaller angular recess 99, adapted to receive the O-ring 100.

This cap has the same cylindrical inwardly extending flange 101 engaging over the end of the filter element 95, and it has an annular sheet metal washer 102 fitting inside, the cylindrical flange 101 and extending inwardly past the O-ring 100 to the point 103, which is the edge of a through aperture in this washer.

Thus the O-ring is located in an annular groove, and the apertures 103 and 104 in the upper cap 92 are of a size to engage slidably on the outside of the inwardly extending tube 36.

The O-ring again is smaller than the outside of tube 36, so that it must be tensioned about the tube, and the O-ring is of larger diameter than the depth of the annular groove in the cap 92, so that the O-ring which is made of rubber, "Duprene," or other suitable material, is compressed in its groove and forms a liquid tight seal.

The filter element is held on the tubular member 38 by the friction which is caused by the gripping of the O ring that is mounted in the annular recess 99 and by the external liquid pressure on the end 91 of the filter unit, which tends to press the filter unit on the tubular member 38.

The filter element 95 may comprise a generally cylindrical member of a fibrous nature, such as cellulose paper, the outer surface of which is indicated at 105, and it has an inner cylindrical chamber 106 and forms a closed tube, the flat ends of which fit in the caps.

The filter element 95 consists of a rectangular sheet of cellulose paper which is folded as tightly as possible at its outer surface 105, and again at its inner surface 106, extending radially back and forth with the folds 107 engaging each other.

In order that the paper may have its folds 107 spaced from each other to admit the liquid between them and so that it may not present a hard, compact surface like the edge of a book, the sheet of paper of which the filter element 95 is made is stamped with a multiplicity of grooves 108 and ridges 109, which are rectangular in cross section and which may be a few thousandths in depth, and which extend longitudinally of the sheet, that is, transversely to the folded edges 110.

These grooves and ridges in the paper prevent the folds 107 from engaging each other too tightly and permit the liquid to penetrate between the folds to pass through the paper over its full area.

The grooves and ridges 108, 109 are preferably of substantial width, as shown.

The filter unit 95, which is thus formed out of cellulose paper, has its ends cemented in the caps 92 and 93 by an initially plastic cement which is insoluble in fuel oil, such as a "Bakelite" cement, thus permanently securing the parts of the filter unit together.

A thermosetting resin in the form of a thin disc may be placed in each cap to be engaged between the cap and filter element, and may be subjected to heat to soften the resin and cause it to adhere and thereafter to increased temperatures for the purpose of causing the thermoresin to set permanently.

An helical coil spring 111 of a size in diameter fitting against the inner cylindrical surface 106 of the filter element is placed inside the filter element, with its coils widely spaced to provide the filter element with suitable support against collapse.

The filter elements of cellulose may be of different porosity having particle retention, for example, of 20 microns, 10 microns, or 5 microns. The number of convolutions may be about eighty-two and the square inches of filter media may be 165 square inches.

Referring to Figs. 6, 7, and 8, these are views of a similar high pressure filter assembly which differs from the preceding one, in that its filter element 112 is of a different construction.

This filter element 112 has the same caps 91, 92 and washer 102 and O-ring 100 fitting in the housing in the same way, except that its filter element 112 is preferably constructed of fine mesh weave Monel wire screen, which may utilize the same back-up spring 111 when the screen has a plane mesh weave.

When the weave is a twilled Dutch weave the back-up spring may be omitted. In one embodiment of the invention such a wire cloth filter element may have a particle retention of .005", or in another .004", or .0029", while the twilled Dutch screen may have a particle retention of 55 microns. The square inches of filter media may be 44.4 square inches and the open area may be 13.32 square inches.

The particle retention listed is merely exemplary of one form of the invention.

The wire cloth filter element 112 is folded back and forth with a multiplicity of easy bends 113 at the outer surface and 114 at the inner surface, separated by integral radial portions 115. The radial portions, for example, may be much closer together than shown in the drawing, where the spacing is exaggerated for the purpose of clarity.

The filter element 112 may again be cemented in the caps by a suitable thermoplastic cement, as described above, forming a complete unitary replaceable filter unit. The caps being made of Monel and the wire screen being also Monel, I prefer to silver braze both ends of the filter element in the caps.

Referring to Figs. 9, 10, and 11, this filter unit 116 includes the same caps 91, 92 and O ring 100 arranged in the same manner and made of the same material.

The filter element 117 in this case is made up of a multiplicity of rings or annular members 118 of sintered bronze powder manufactured by pressing the powder under tremendous pressures and subjecting the same to heat for sintering.

A perspective of such a ring is shown in Fig. 11, a cross section in Fig. 12, and the top in Fig. 10.

Each ring includes a frusto-conical wall portion 119, which may be provided at its ends with a narrow, cylindrical flange 120 at the small end and 121 at the large end. The edges 122 and 123 of the ring may be plane and thus are adapted to engage flatly against the edge of another ring at the end having the same size.

When the rings are alternately arranged with a pair having larger ends in engagement and the small ends of adjacent pairs also engaging alternately, a bellows-shaped assembly is formed, as indicated in the filter element of Fig. 9.

The minimum wall thickness for practical purposes may be 1/32 of an inch. In a ring having a small diameter of 1 1/64" the larger diameter outside may be 1 23/32.

The sintered bronze rings may have all their joints silver brazed to adjacent rings and to the Monel caps, thus forming a unitary porous assembly. For example, the particle retention may be 20 microns, 10 microns, 5 microns or 2 microns.

The filter area may be 31 square inches in the size described. This filter element has the advantage that its unit rings may be subjected to a coining operation for controlling the porosity, and the rings may be tested by sound waves to check and control the porosity.

The characteristics of the filter elements will be apparent from the foregoing description, and the characteristics of the complete filter, such as that shown in Fig. 2, may be substantially as follows:

| | |
|---|---|
| Rated capacity | 12 gals. per min. |
| Degree of filtration | 10 microns. |
| By-pass valve setting | 45–50 p. s. i. |
| Operating pressure | 6,000 p. s. i. |
| Pressure drop at 12 gals. per min. with clean fluid and clean element not to exceed | 8 p. s i. |

The operation of the high pressure filter is as follows:
The liquid to be filtered passes in at 33 through the conduit 43 into the chamber 62, about the filter unit 63.
The lower end of the interior of the filter element is closed while the upper end communicates with the bore 35, leading to outlet 34. Therefore, the liquid must pass through the filter element to the interior of the filter element, the solids being retained on the outer surface of the filter element and some solids dropping to the bottom of the inside of cover 22.

When the filter element becomes so clogged that pressure increases to around 45 to 50 pounds per square inch, at the inlet, as distinguished from the outlet side, the by-pass valve opens, letting the liquid through and preventing breakage of parts.

When there are heavy surges of pressure they open the by-pass valve and permit the liquid to pass freely.

When the by-pass valve needs replacement it may be removed and a new unit substituted, and when the filter gets dirty or clogged it may be removed as a unit and a new unit substituted.

It will thus be observed that I have invented improved filters having improved replaceable by-pass valves and replaceable filter units of various types. The by-pass valve has the advantage that its spring pressure is adjustable to different relief pressures. It is replaceable and may be manufactured at a low cost. There are no restrictions in the stream when the by-pass valve is open.

The filter units have the advantage that the caps being secured directly to the filter medium, they form a strong, light unit, eliminating breakage, preventing leaks, and absorbing shock.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

In a high pressure filter, the combination of an upper housing member comprising a solid metal block body having a through bore, internally threaded at both ends, forming inlet and outlet ports, said through bore communicating with a downwardly extending bore, located in a depending tube carried by a partition wall having a thicker wall tubular formation supporting said tube, a spring pressed valve in said through bore between the inlet end of said through bore and said downward bore and adapted to be opened by predetermined inlet pressure to pass liquid, said partition having an aperture passing liquid from said inlet to an annular space about said thick walled tubular formation, a filter unit having an aperture in one end slidably receiving said tube and having an inwardly open annular groove about said tube containing an O-ring about said tube, said upper housing having a thick wall provided with a cylindrical bore and a larger threaded counterbore surrounding said filter unit, an O-ring in an annular groove in said cylindrical bore, a thick-walled cover having a cylindrical end fitting in said cylindrical bore engaging said latter O-ring, and having a larger threaded portion in said threaded counterbore and an annular shoulder engaging the end of said thick wall, said cover having an internal bore enclosing said filter unit, said filter unit comprising a pair of metal caps, each having a cylindrical border flange, and one of said caps having an annular depression surrounding a circular aperture, said border flange on said latter cap containing a circular plate with a registering circular aperture and forming said inwardly open annular groove, said caps engaging the ends of a filter element comprising a rectangular sheet of fine mesh wire screen, folded back and forth and formed into a cylindrical element, with its folds extending radially and joined by U-bends inside the border flanges of said caps and secured to the caps by an initially plastic securing material.

References Cited in the file of this patent

UNITED STATES PATENTS

| | | |
|---|---|---|
| 326,549 | D'Este | Sept. 22, 1885 |
| 634,820 | Henry et al. | Oct. 10, 1899 |
| 1,251,601 | Weiwoda | Jan. 1, 1918 |
| 2,146,641 | McWane | Feb. 7, 1939 |
| 2,439,936 | Kasten | Apr. 20, 1948 |
| 2,524,951 | Ashton | Oct. 10, 1950 |
| 2,532,177 | Maunula | Nov. 28, 1950 |
| 2,627,350 | Wicks | Feb. 3, 1953 |
| 2,641,278 | Eplett et al. | June 8, 1953 |
| 2,642,187 | Bell | June 16, 1953 |
| 2,661,762 | Bryant | Dec. 8, 1953 |
| 2,661,966 | Edelen | Dec. 8, 1953 |
| 2,693,281 | Winzen | Nov. 2, 1954 |
| 2,743,019 | Kovacs | Apr. 24, 1956 |